United States Patent
Bakovic et al.

(10) Patent No.: US 11,982,984 B2
(45) Date of Patent: May 14, 2024

(54) AUTOMATION SYSTEM FOR MONITORING A SAFETY-CRITICAL PROCESS

(71) Applicant: PILZ GMBH & CO. KG, Ostfildern (DE)

(72) Inventors: Daniel Bakovic, Ostfildern (DE); Uwe Schoch, Ostfildern (DE); Matthias Schweiker, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 525 days.

(21) Appl. No.: 17/180,755

(22) Filed: Feb. 20, 2021

(65) Prior Publication Data

US 2021/0278815 A1 Sep. 9, 2021

Related U.S. Application Data

(63) Continuation of application No. PCT/EP2019/066172, filed on Jun. 19, 2019.

(30) Foreign Application Priority Data

Aug. 21, 2018 (DE) .................... 10 2018 120 344.6

(51) Int. Cl.
*H04L 9/08* (2006.01)
*G05B 19/042* (2006.01)
*G07C 3/08* (2006.01)

(52) U.S. Cl.
CPC ........... *G05B 19/0425* (2013.01); *G07C 3/08* (2013.01); *H04L 9/0869* (2013.01)

(58) Field of Classification Search
CPC ...... G05B 19/0425; G07C 3/08; H04L 9/0869
See application file for complete search history.

(56) References Cited

U.S. PATENT DOCUMENTS 5,880,568 A 3/1999 Bederna et al.
6,161,202 A * 12/2000 Kuntzsch ............ G06F 11/1608
714/25

(Continued)

FOREIGN PATENT DOCUMENTS

DE 19754769 A1 6/1999
DE 10320522 A1 11/2004

(Continued)

OTHER PUBLICATIONS

DIN EN ISO 13849-1: Safety of machinery—Safety-related parts of control systems—Part 1: General principles for design; Nov. 2006; 97 Pages.

(Continued)

*Primary Examiner* — Kamini B Patel
(74) *Attorney, Agent, or Firm* — Miller Johnson

(57) ABSTRACT

An automation system for monitoring a safety-critical process includes a platform configured to execute user programs that implement a safety function, a fail-safe peripheral module configured to couple the user programs with the safety-critical process, and a monitoring device configured to ensure fail-safe execution of the safety function on the platform. The monitoring device is couplable to the platform via a first communication interface and the fail-safe peripheral module is couplable to the platform via a second communication interface. The monitoring device runs a fail-safe service independently of the platform, via which the monitoring device interacts with the fail-safe peripheral module. The fail-safe peripheral module signals a safe state based on the implemented safety function and the fail-safe service.

24 Claims, 7 Drawing Sheets

(56) References Cited

U.S. PATENT DOCUMENTS

| | | |
|---|---|---|
| 6,487,695 B1 | 11/2002 | Kranitzky |
| 7,715,932 B2 | 5/2010 | Seizinger |
| 2001/0011254 A1* | 8/2001 | Clark .................. G06F 21/125 |
| | | 705/59 |
| 2006/0190101 A1 | 8/2006 | Seizinger |
| 2009/0072986 A1 | 3/2009 | Bussert et al. |
| 2013/0233044 A1 | 9/2013 | Arth et al. |
| 2016/0334775 A1 | 11/2016 | Haerter et al. |
| 2016/0347182 A1* | 12/2016 | Adam .................. G07C 5/0808 |
| 2017/0053710 A1* | 2/2017 | Rohleder ............... G11C 14/00 |
| 2017/0139411 A1* | 5/2017 | Hartung ................. H04L 12/40 |
| 2019/0105788 A1* | 4/2019 | Pilz ........................ B25J 9/1674 |
| 2019/0222484 A1* | 7/2019 | Ricci ........................ G08G 1/16 |
| 2021/0278816 A1* | 9/2021 | Schweiker ............... G05B 9/02 |

FOREIGN PATENT DOCUMENTS

| | | |
|---|---|---|
| DE | 102006046286 A1 | 6/2007 |
| DE | 102014100970 A1 | 7/2015 |
| EP | 1043641 A2 | 10/2000 |
| JP | 2006525565 A | 11/2006 |
| JP | 2009519525 A | 5/2009 |
| JP | 2013186903 A | 9/2013 |
| JP | 2014098985 A | 5/2014 |
| WO | WO-9613657 A1 | 5/1996 |

OTHER PUBLICATIONS

DIN EN ISO 12100: Safety of machinery—General principles for design—Risk assessment and risk reduction; Nov. 2010; 88 Pages.
International Standard: Functional safety of electrical/electronic/programmable electronic safety-related systems; Part 7: Overview of techniques and measures; IEC 61508-7 Edition 2.0; Apr. 2010; 300 pages.
Safety critical smart systems with software coded processing; Martin Süßkraut, Jörg Kaienburg; dated Mar. 2015; 9 pages.
Vital coded microprocessor principles and application for various transit systems; P. Forin; dated Feb. 18, 2021; 6 pages.

\* cited by examiner

AUTOMATION SYSTEM FOR MONITORING A SAFETY-CRITICAL PROCESS

CROSS-REFERENCE TO RELATED APPLICATIONS

This application is a continuation of PCT International Application No. PCT/EP2019/066172 filed Jun. 19, 2019, which claims priority to German Application No. 10 2018 120 344.6 filed Aug. 21, 2018. The entire disclosures of the applications referenced above are incorporated by reference.

FIELD

The present disclosure relates to an automation system for monitoring a safety-critical process, a corresponding method, and a monitoring device for safe execution of a safety function implemented by user programs on a platform, and a fail-safe peripheral module for coupling a platform, which executes user programs to implement a safety function, to a safety-critical process.

BACKGROUND

Automation systems for monitoring a safety-critical process are used to reduce a risk posed by technical installations to people and the environment. For this purpose, safety functions are implemented that transfer the technical system or the safety-critical process to a safe state in the event of danger. According to DIN EN ISO 13849-1 and DIN EN ISO 12100, the term safety function refers to a safety-related control function of a machine that reduces a risk emanating from the machine to an acceptable level. A safety function is, for example, the shutdown of a machine after pressing an emergency stop button.

Originally, safety functions were implemented by individual safety assembly, for example in the form of safety switching devices with relay technology, which acted independently of a control system for the installation to be monitored. In further development, safety switching devices were then logically linked to each other in order to implement more complex safety functions.

Nowadays, safety controllers are used for even more complex tasks. Safety controllers arose primarily from the desire to be able to interconnect safety by programming in a similar way to a programmable logic controller (PLC). In their actual function, safety controllers therefore differ only slightly from PLC controllers. In essence, a safety controller corresponds to two individual PLC controllers that execute a user program in parallel, use the same process image of the inputs/outputs and constantly synchronize each other.

Internally, however, the structure of a safety controller differs considerably from a PLC controller in order to implement the safety-related requirements. A safety controller therefore regularly differs from a PLC controller in that it has two separate channels, a diversitary structure with different hardware, continuous testing of the inputs and outputs, continuous comparison of the user data, voltage and time monitoring, and safe shutdown in the event of a fault or hazardous situation. In addition, the components involved in the safety functions—especially the CPUs (Central Processing Unit)—must be fail-safe. In order to implement standard-compliant safety, in particular to achieve a Safety Integrity Level (SIL 3) according to IEC 61508, CPUs were therefore originally used redundantly, i.e. at least two CPUs monitoring each other.

From EP 1 043 641 A2 a fail-safe automation system is known, which is based on a standard CPU. The error control measures are integrated into the user program as far as possible and include: safety protocols, temporal program flow control, logical program and data flow control, data protection through information redundancy, diversitary processing as well as self-tests within the process error tolerance time. Commands that cannot be implemented diversitarily are tested within the process error tolerance time. In addition, to detect multiple errors within the multiple error occurrence time, background tests are performed by the CPU's operating system.

A disadvantage of the safety concept according to EP 1 043 641 A2 is that the fault control measures mentioned are processor-dependent and therefore, for SIL 3 according to IEC 61508, fail-safety for the processor must be ensured. However, for complex processors, a diagnostic coverage (DC) of at least 99% based on a Failure Mode Effect Analysis (FMEA) of the processor is no longer practicable. The processor used in EP 1 043 641 A2, on the other hand, is a special ASIC of low complexity that directly processes the code provided. Therefore, proof of fail-safety of the processor can be carried out with justifiable expenditure. However, when using other standard CPUs, the corresponding code cannot be executed directly, so that the compiler creating the machine code from the corresponding code must also be analyzed. Furthermore, for the detection of multi-layered faults, hardware-related background tests are required, which are not implemented or not implemented with sufficient effectiveness on standard CPUs and consequently have to be implemented separately when using a standard CPU.

A processor-independent approach is pursued by the so-called Software Coded Processing (SCP). A system augmented with SCP is capable of revealing transient, permanent, and systematic execution errors during runtime. In addition, interference between different programs (functional programs, middleware, operating system) can be detected and displayed. A known variant of SCP is the so-called AN-coding, i.e. an arithmetic coding in which each value of a program is multiplied by a constant A, in particular a prime number. All values and states in the system that are not multiples of A are subsequently considered invalid states.

Forin, P.: "Vital coded microprocessor principles and application for various transit systems" in Perrin, J. P.: Control, Computers, Communications in Transportation. Selected Papers from the IFAC/IFIP/IFORS Symposium, Pergamon, Oxford, UK, 1990, p. 79-84 describes an initial approach to a fail-safe system based on coded processing. The system described comprises a fail-safe input module that encodes the input signals and a standard CPU (coded monoprocessor) that computes state and output signals from the encoded input signals by coded operations and creates a signature over them. A fail-safe dynamic controller checks the signatures calculated by the standard CPU and switches off a safe output module in the event of an error. The method thus combines arithmetic coding (multiplication with prime number A) and a signature method (static signature, dynamic signature) and altogether enables a computational determination of a diagnostic coverage without having to perform a complex FMEA of the CPU.

Süßkraut, Martin and Kaienburg, Jörg: "Safety critical smart systems with software-coded processing" describe a practical implementation of a fail-safe system based on SCP. The implementation is based on two different (diversitary) executions (native and coded) of the same safety function and supports industry standards such as IEC 61508 due to its special design. The native execution corresponds to the execution of the original source code of the safety function (native program) and processes the native input values and states. Thus, only the native states are processed and the result of the native execution are the native outputs. In coded execution, a coded form of the original safety function is executed (coded program). This requires that the original source code of the safety function has been transformed and coded in advance. The coded program then operates on coded input values, coded states, and produces a coded output. The native and coded programs both operate on the same output values, with the coded input values being the coded variant of the native input values. The same applies to the state and output values. The native and the coded program are executed and managed by a so-called diversity framework. The diversity framework is generated from the source code of the original safety function by enriching the source code with appropriate annotations. The diversity framework coordinates the parallel execution of the two programs (native and coded) and checks for error-free execution using checksums it builds over the native and coded output values. Further, the diversity framework can monitor the control flow of the safety function by having the diversity framework integrate the control flow check data flow such that any control flow error changes the output checksum.

The disadvantage of the aforementioned SCP-based methods, however, is that the coded operations cost a lot of runtime and the code generation is costly and complex, especially if signature methods are also used. For example, with SPC, the coded program requires more bits to store and process values than the native variant. For example, if the native program uses 32-bit data types, the coded program must use at least data types that can store A times the largest possible value of a 32-bit data type. Therefore, the coded program is usually implemented with 64-bit data types if the native program uses 32-bit data types. Likewise, all native operations are to be replaced by corresponding coded operations, whose execution costs more runtime than the native operations and requires a correspondingly complex tool chain for its creation.

SUMMARY

It is an object to specify a safe automation system which avoids the above mentioned disadvantages. Further, it is an object to provide a safe automation system that is mainly based on standard components. Yet further, it is an object to provide a safe automation system that enables the implementation of a standard-compliant safety function of a high safety category.

According to one aspect of the present invention, there is provided an automation system for monitoring a safety-critical process, comprising a platform for executing user programs, which implement a safety function, a fail-safe peripheral module, via which the safety-critical process can be coupled to the user programs, and a monitoring device configured to ensure fail-safe execution of the safety function on the platform, wherein the monitoring device can be coupled to the platform via a first communication interface and the fail-safe peripheral module can be coupled to the platform via a second communication interface, and wherein the monitoring device is configured to run at least one fail-safe service independently of the platform, via which the monitoring device interacts with the fail-safe peripheral module, and wherein the fail-safe peripheral module is configured to signal a safe state as based on the implemented safety function and the fail-safe service.

Furthermore, there is provided a corresponding method.

According to a further aspect of the present invention, there is provided a monitoring device for ensuring fail-safe execution of a safety function implemented by user programs on a platform, wherein the monitoring device couplable to the platform via a first communication interface and configured to run at least one fail-safe service independently of the platform, via which the monitoring device interacts with a fail-safe peripheral module, so that the fail-safe peripheral module signals a safe state based on the implemented safety function and the fail-safe service.

According to a further aspect of the present invention, there is provided a fail-safe peripheral module for coupling a safety-critical process to a platform, which executes user programs in order to implement a safety function, wherein the fail-safe peripheral module is configured to interact with a fail-safe service implemented on a monitoring device that is couplable to the platform and implemented independently thereof, wherein the fail-safe peripheral module is configured to signal a safe state based on the implemented safety function and the fail-safe service.

Thus, it is an idea of the present invention to ensure safe implementation of a safety function, realized mainly in software, on any platform, in particular a non-secure platform, by means of platform-external components, wherein the safety related external components are designed as simple as possible. In other words, it is an idea to implement complex safety function predominantly in software on a low-cost platform, and to ensure the required intrinsic fault safety by components that are easy to implement and that can be certified with less effort.

The external components, which may be implemented as dedicated hardware, interact in such a way that a safe state of the process is assumed in case of faulty execution of the user programs on the platform, faulty behavior of the platform itself, or faults in the communication with the platform. For this purpose, a monitoring device ensures fail-safe execution of the user programs. The monitoring device may cooperate with a safety-related runtime environment on the platform. In case of an error, the monitoring device can initiate the execution of the safety function, in particular shut down the process, independently of the platform via the fail-safe peripheral module by a separate service executed independently of the platform like a "watchdog".

The platform can be a software, a hardware or a virtual platform that serves as the basis for the development and execution of user programs. In particular, the platform may be a non-safe platform, for example, a single channel system such as a standard PC. Alternatively, the platform may be provided in the form of cloud computing, in particular as Infrastructure as a Service (IaaS) or Platform as a Service (PaaS). In a various embodiments, the platform may already include a safety-related runtime environment. In this context, non-safe means that the non-safe platform does not in itself meet the relevant safety requirements to execute a safety function with the required level of intrinsic safety on its own.

The fail-safe service may implement simple data processing functions or operations that can be implemented reliably and fail-safe in hardware or software. Furthermore, they can be certified with little effort in accordance with the relevant safety standards, even for high safety categories. The monitoring device is therefore limited to what is necessary for the exclusive execution of the at least one fail-safe service.

The monitoring device is coupled to the fail-safe peripheral module via a communication interface, which is in particular also non-safe, i.e. single-channel, in order to exchange cyclic data generated by the fail-safe service with the latter according to a defined scheme. Based on the data exchange that takes place via the platform, proper operation of the monitoring device and, associated with this, monitoring of the platform or monitoring of a safety-related runtime environment implemented thereupon can be ensured, wherein any error of the monitoring device leads to triggering the safety function. In addition to the fail-safe service, the monitoring device may have other devices that interact with the platform and, in particular, with a safety-related runtime environment, which runs on the platform independently of the user programs.

Thus, an idea of the present disclosure is that a safety function of any complexity can be implemented on standard hardware or standard assemblies, with the final safety being supplemented by a simple, separate component. The invention is therefore based on the principle of making the individual components of the automation system involved in the safety function only as safe as necessary, with a high safety level being achieved by the interaction of the individual parts. Thereby, for example, computationally intensive tasks can be implemented on faster and more cost-effective hardware, and the necessary safety features are supplemented by dedicated hardware. The dedicated hardware itself is not capable of executing the complex safety function on its own, but has just enough computing power to ensure the fail-safe execution of the safety function by executing simple services.

Accordingly, the monitoring device implementation can be less complex than the implementation of the safety function-executing platform. Thereby, certification by the competent authorities is simplified. Advantageously, the safety-related safeguarding is implemented independently of the safety function. Thereby, a safety-related certification can essentially take place independently of the individually implemented safety function.

Triggering the safety function itself can be initiated by the monitoring device, while the execution is left to a fail-safe peripheral module, which has to be present in any case, when the automation system is built from standard components. Thus, one focus of the invention is to distribute individual aspects of a safety-controller to different components, with each component setting its own focus and being optimized for that focus. In this way, a complex safety function of a high safety category can be implemented cost-effectively and flexibly.

In various embodiments, the monitoring device is configured to receive a random value from the platform, in particular a random value generated by the fail-safe peripheral module. The random value can be used to easily determine whether a remote station is working properly. A random number generator can also be easily implemented in a fail-safe manner. This refinement thus contributes to a simplified embodiment of the fail-safe service.

In a further refinement, the fail-safe service comprises a counter unit configured to generate a continuous counter value and an encoding unit configured to generate a key value. A fail-safe counter unit and a fail-safe encoder unit may together provide a fail-safe service, via which sufficient fail-safety of the executing platform can be provided. At the same time, a fail-safe counter unit and a fail-safe encoder unit are easy to implement as fail-safe components and are regularly available as fail-safe modules off-the-shelf. The monitoring device can thus be implemented in a particularly cost-effective manner. Preferably, the counter unit and the coding unit are implemented in a fail-safe manner, i.e. it is ensured by design that a fault in one of these units is detected. For example, the counter and the encoder may be multi-channel redundant units and implemented on hardware that is also multi-channel redundant. Since both, counter and encoder, are simple units, their intrinsic error safety can be reliably guaranteed and verified with little effort. Thus, this refinement further contributes to realize the safety of the automation system in a particularly cost-effective manner.

In a further refinement, the encoding unit may generate the key value from a random value and the continuous counter value. The random value is thus provided by or via the platform, i.e. fed to the monitoring device from outside. The monitoring device checks whether the random values, which may be received cyclically, change over time. At the same time, coding with the consecutive counter value is a simple way to ensure that all numbers are passed through. Thus, the monitoring device does not have to check separately whether the random number generator, which provides the random value, really cycles through all values, which would only be possible with difficulty due to the weak performance of the monitoring device as intended. The refinement thus further contributes to a cost-effective realization of the monitoring device.

In a further refinement, the first communication interface is further configured to forward the continuous counter value and the key value to the platform, and the fail-safe peripheral module is configured to signal the safe state based on the implemented safety function, the key value, and the continuous counter value. In this refinement, a data exchange, by means of which a safeguarding of the safety function executed on the platform can be ensured, can be easily implemented.

In a further refinement, the monitoring device is a stand-alone hardware component detachable from the platform by the user, in particular a hardware dongle. In this refinement, the monitoring device is thus also implemented independently of the platform on the hardware side and can be connected to it, for example, as a simple USB dongle. The independent hardware and the encapsulation of the safety function executed on the platform from this hardware enables an independent certification of the monitoring device, which can be carried out particularly easily and cost-effectively. The refinement thus further contributes to a particularly favorable realization of the monitoring device.

In an alternative refinement, the monitoring device can be integrated into the fail-safe peripheral module. In this context, integrated means that the individual function groups of the monitoring device are implemented on the hardware of the fail-safe peripheral module. Thereby, components can be shared cost-effectively between the monitoring device and the fail-safe peripheral module. For example the fail-safe peripheral module and the monitoring device may share a common safe hardware base. The refinement thus contributes to a simple realization of the automation system, since in addition to the platform only one separate component, on which the monitoring device and the fail-safe peripheral module are integrated, is required.

In a further refinement, the first and/or second communication interface is a non-safe communication interface. In this refinement, the communication interfaces do not in themselves represent safe units that could ensure safety-related communication, but are, for example, commercially available USB interfaces. In this case, safety can be ensured independently of the communication, in particular by the interaction of the monitoring device with the fail-safe peripheral module (Black-Channel-Principle). This refinement has the advantage that a low-cost standard communication interface can be used, which can further reduce the cost of the overall system.

In a further refinement, the monitoring device is configured to transmit a false value that does not correspond to the key value as a key value at a defined time. By deliberately sending incorrect values and reading back the outputs of the fail-safe peripheral module, the safe interaction of the monitoring device with the fail-safe peripheral module can be tested in a simple manner.

In a various embodiments, the monitoring device can be configured to invert a bit of the key value to generate the false value. The monitoring device may invert the bit of the key value in a rolling manner. The monitoring device thus cyclically checks whether incorrect numerical values as key values lead to an expected failure. The monitoring device may invert one bit of the correct key value on a rolling basis. With an 8-bit number, a stuck-on-high error is detected after eight test cycles at the latest. The refinement thus further contributes to improving safety.

In a further refinement, the fail-safe peripheral module comprises a decoding unit for generating an intermediate value from the continuous counter value and a random value, and a comparator unit for comparing the intermediate value with the key value. The fail-safe peripheral module may thus have complementary means to the monitoring device to interact with it. In particular, the decoding unit and the comparator unit can be implemented in a fail-safe manner. This refinement further contributes to ensure that the monitoring device can be implemented in a simple manner, since the fail-safe peripheral module is adapted to the monitoring device. All in all, by dividing the automation system into the proposed components, a cost-effective automation system suitable for a high safety category is achievable.

In a further refinement, the fail-safe peripheral module comprises first and second output circuits that are activatable and de-activatable and on which the comparator unit acts in an alternating manner, so that the first or second output circuit is alternately activated, and wherein the fail-safe peripheral module signals a safe state when the first or second output circuit is activated. The fail-safe peripheral module can thus have two output circuits that can be activated and deactivated like switches. Preferably, the output circuits are configured to deactivate themselves after a defined period of time following activation. For this purpose, the output circuits can, for example, each have a monostable flip-flop (also called monoflop), on which the comparator unit acts alternately, so that at least one monostable flip-flop is triggered. The fail-safe peripheral module signals a safe state when at least one of the two monostable flip-flops is triggered. By using two output circuits which can be activated and deactivated in a simple manner, for example by means of monostable flip-flop stages, the fail-safe peripheral module can be simplified, since a usual multi-channel redundant evaluation unit with two redundantly operating processors is not needed. Since monoflops or other switch-like components are many times less expensive than processors, the embodiment contributes to a cost-effective implementation of the fail-safe assembly.

In a further refinement, when an incorrect value is transmitted as a key value, the fail-safe peripheral module is configured to generate a time-out signal via one of the two output circuits and to simultaneously signal the safe state via the other output circuit. By controlling the output circuits so that one holds while the other is tested, the proper operation of the monitoring equipment and the fail-safe peripheral module can be verified without actually having to transfer the process into a safe state. Such a test therefore does not restrict the availability of the automation system.

In a further refinement, the fail-safe peripheral module comprises a safe random number generator to generate a random value (S). Alternatively, the fail-safe peripheral module is configured to receive a random value (S). The random value, which is added to the monitoring device from the outside, can thus be generated in particular by the fail-safe peripheral module, so that the random number generator can make use of the safe facilities of the fail-safe peripheral module for its implementation. The implementation of a safe random number generator can thus be realized in a simple manner.

In a further refinement, the fail-safe peripheral module is a stand-alone hardware component. In this way, the fail-safe peripheral module can be implemented and designed to be fail-safe independently of the platform. The fail-safe peripheral module can thus be used flexibly for different platforms, wherein the intrinsic fault safety of the peripheral module can be guaranteed independently. The refinement thus further contributes to a flexible design of the automation system.

In a further refinement, the monitoring device and/or the fail-safe peripheral module can be of a multi-channel redundant design. A multi-channel redundant design is a well-known procedure in safety engineering to implement a fail-safe system. Since, according to the invention, the monitoring device and the fail-safe peripheral module are designed to be as simple as possible, a multi-channel redundant design can also be implemented in a particularly cost-effective manner.

In a further refinement, the fail-safe peripheral module can comprise a fail-safe clock generator. For the implementation of various safety functions, a safe clock signal is regularly required to ensure fail-safety of various components. As the safe clock signal is provided by the fail-safe peripheral module, no additional safe component is required. This refinement thus further contributes to a flexible design of the automation system.

It is understood that the above mentioned features, and those to be explained below, may be used not only in the combination indicated in each case, but also in other combinations or alone, without departing from the scope of the present invention.

BRIEF DESCRIPTION OF THE DRAWINGS

Embodiments of the invention are shown in the drawings and are explained in more detail in the following description.

DETAILED DESCRIPTION

Figure 1:
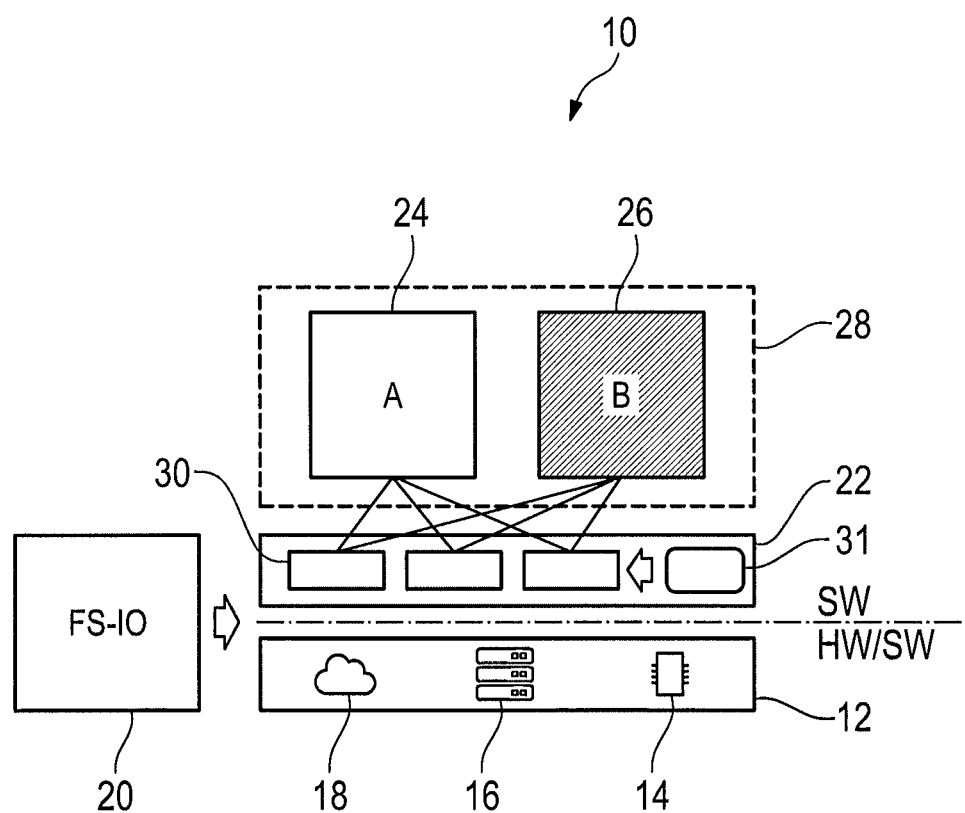
FIG. 1 is a schematic representation of an automation system according to the principles of the present disclosure.

FIG. 1 shows a first embodiment of the automation system in a schematic diagram. The automation system in its entirety is denoted by reference numeral 10. According to this embodiment, the automation system 10 comprises hardware and software components that together form a safe automation system. In this context, the term "safe" means that for an implemented safety function a Safety Integrity Level 3 according to IEC 61508 can be achieved by the automation system.

The automation system includes a platform 12 that serves as a data processing device and a computing unit. The platform 12 may be dedicated hardware 14, real or virtual computing systems 16, or infrastructure 18 provided as a cloud service. The platform 12 may also comprise a combination of the aforementioned equipment.

The platform 12 may be a non-safe platform or may be at least partially composed of non-safe components. In this context, the term "non-safe" means that the components of the platform 12 do not provide sufficient intrinsic safety in the sense of the relevant safety standard to be able to implement a safe system on their own. The platform 12 may thus be composed, for example, of commercially available PC hardware and may comprise, for instance, standard processors. Similarly, in various embodiments, the platform or components of the platform may be provided in the form of cloud computing.

The platform 12 may comprise hardware and software components. For example, the platform 12 may be a non-safe device, such as a PC or a Raspberry Pi, running a non-safe real-time operating system (RTOS), such as various Linux derivatives.

The automation system 10 further comprises at least one fail-safe peripheral module 20 for fail-safe input from the process and fail-safe output to the process. The fail-safe peripheral module 20 enables the automation system to be connected to the process. Fail-safety of the peripheral module 20 as well as safety-related communication between the peripheral module 20 and the automation system 10 is achieved by principles generally known in the field of safety technology and is not further elaborated herein.

The platform 12 and the fail-safe peripheral module 20 together form the basis and the interfaces of the safe automation system 10, while a safe runtime environment 22 implemented on the platform along with the user programs 24, 26 implement the actual safety function 28.

The safe runtime environment 22 is a software layer disposed between the platform 12 and the user programs 24, 26 and provides safe resources 30 to the user programs 24, 26 independent of the platform 12. The safe runtime environment 22 loads the user programs 24, 26, executes them on the platform, and coordinates their interconnections. The safe runtime environment 22 thus itself represents a small platform by means of which the user programs 24, 26 are executed.

Preferably, the user programs 24, 26 are formed specifically for the platform 12, i.e. the user programs 24, 26 are written in a programming language that can be converted into native machine code of the platform 12 for execution. The safe runtime environment 22 is thus not an "operating system" for executing the user programs 24, 26, but merely encapsulates safe resources 30 for the user programs 24, 26 so that they can be included in the user programs 24, 26 without requiring the user programs 24, 26 to ensure fail-safe execution of the safe resources 30. The safe runtime environment 22 may in turn be divided into platform-specific components and platform-independent components, wherein in particular the safe resources 30 are implemented by platform-independent components so that the safe runtime environment 22 can be easily ported to different platforms.

The safety function 28 may be any safety function, such as emergency stop, two-hand control, or remote I/O. The safety function 28 is thus a safety-related control function implemented by the automation system. The safety-related control function may be implemented by two user programs 24, 26 which are executed in parallel. In addition to being redundant, the user programs may be of diversitary design, i.e. the user programs may be designed such that the same result is achieved by the user programs 24, 26 in different ways.

A computation is fully diversitary if the mutual non-reactivity of the parts of a processor used in the computation, or the mutual non-reactivity of the diversitary uses of the same parts of a processor, are verified. Such a proof usually requires hardware tests, which may be omitted in the case of coded processing in the sense of SCP and may also be omitted in the case of the automation system according to this disclosure if these hardware tests can be compensated for by additional tests and the safe resources 30 of the safe runtime environment and can be made verifiable externally.

In a various embodiments, diversity between the first and second user programs 24, 26 is achieved by the second user program 26 operating on diversitary data relating to the first user program 24 and consequently using different instructions for the same computational steps. The use of such inverse data does not provide complete diversity, but it does provide sufficient diversity to allow sufficient fail-safety in conjunction with the safe runtime environment 22 and the tests 31 provided thereof.

A program version that works with inverse data (referred to below as an inverse user program) can easily be generated automatically from the native program version according to a defined conversion scheme. The inverse user program can thus be executed with comparable effort as the native user program. Furthermore, unlike a coded user program in the sense of SCP, the inverse user program can work with the same data types and rely on the same instruction set because calculations with inverse data are based on the same arithmetic. An inverse user program is therefore less complex than a coded user program based on arithmetic coding, for example AN coding. In addition, a tool chain for creating the inverse program version out of the native program version can be implemented with less effort. Due to the simplified tool chain a fast porting to other systems or the use of another programming language is possible. Overall flexibility can thus be increased.

The concept is therefore based, inter alia, on the assumption that while coded processing according to SCP can reveal execution errors in an application program more unambiguously and reliably than the diversitary processing proposed herein, the effort required to do so is not justified, since it is always necessary to integrate the application into a safety model in order to achieve a high safety classification.

It is thus an idea, instead of increasing the intrinsic fail-safety of individual components, such as the intrinsic fail-safety of the user program through SCP, to perform an overall assessment and to make the individual components of the automation system only as safe as necessary, so that overall a safe automation system is created, which can perform the safety function in accordance with a high safety level. Thus, one focus of the present concept is to make the individual components of the automation system, i.e., in particular, the user programs 24, 26, the safe runtime environment 22, and the platform 12, as simple and flexible as possible so that a balanced trade-off between safety, complexity, and portability is achieved at all levels of the automation system.

Figure 2:
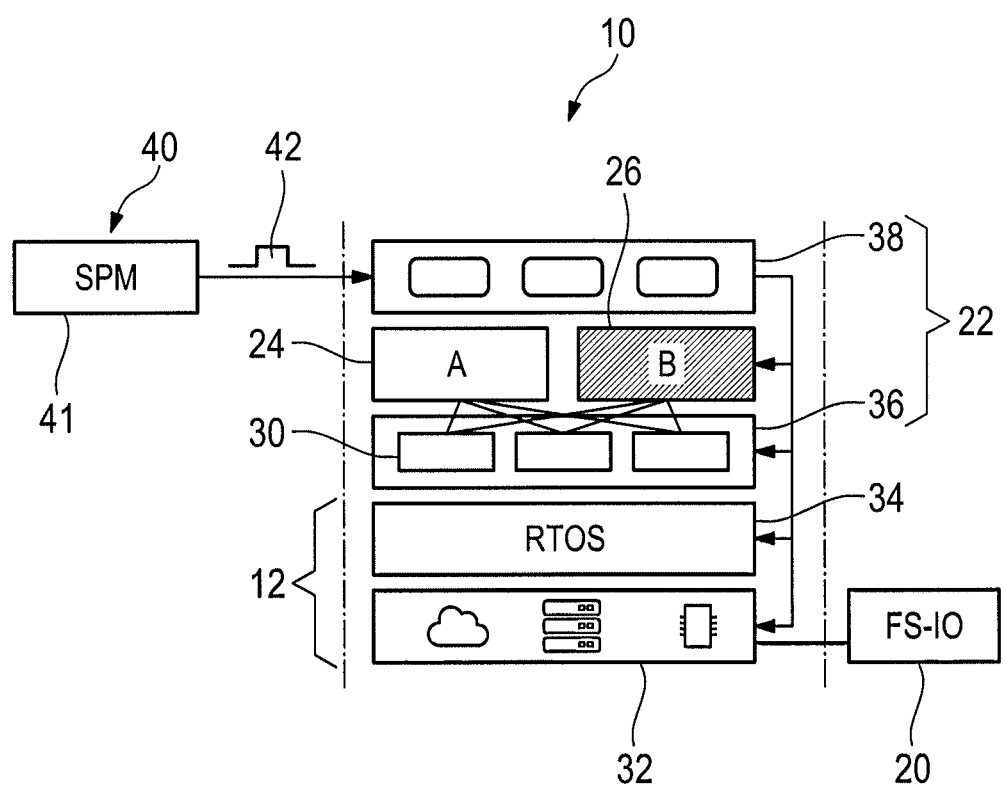
FIG. 2 is a schematic representation of a safety model of an automation system according to the principles of the present disclosure.

FIG. 2 shows a schematic representation of a safety model of an automation system according to a further embodiment.

Here, the safe runtime environment 22 is deployed on a non-safe device 32 having a non-safe real-time operating system 34. Together, the non-safe device 32 and the non-safe real-time operating system form the platform 12. The safe runtime environment 22 is a software layer that, on the one hand, provides, in a resource layer 36, safe resources 30 for the user programs 24, 26 that are independent of the platform 12 and, on the other hand, forms a local safety instance 38 for monitoring the user programs 24, 26 and the safety function implemented by the latter. Furthermore, the user programs 24, 26 are connected to the process to be monitored via a safe peripheral module 20.

The safe runtime environment 22 may in turn be monitored by a safe device. The safe device (hereinafter also referred to as safety pacemaker (SPM) 40) may be a simple hardware dongle, for example in the form of a commercially available USB stick, with one or more simple microcontroller, such as a PIC microcontroller or an AVR microcontroller. It will be understood that a hardware dongle is not limited to a USB interface, but the SPM 40 may also be connected via Ethernet, RS232 or other communication interfaces.

The SPM 40 implements a second safety instance 41. The second safety instance may be implemented externally. The second safety instance 41 tests the safe runtime environment 22, in particular the first local safety instance 38, by selective error injection. Error injection occurs via services and manipulators of the safe runtime environment 22 that are activated by the external safety instance 41. Thereby, data comparators, a system clock, and timer tests of the safe runtime environment 22 can be checked and errors in the execution of the user programs 24, 26 can be disclosed without having to consider and/or implement appropriate tests during the development of the user programs 24, 26. Thus, the first user program 24 may be written in a single-channel manner without requiring the application programmer to consider fail-safety of the user program. A second user program 26, which is diversitary to the first user program, may be automatically generated by an appropriate tool chain. Thereby, the application developer may focus exclusively on implementing the actual safety function.

In various embodiments, the SPM 40 may additionally provide a safety clock signal 42, in particular to implement a second shutdown path at the fail-safe peripheral module 20.

Figure 3:
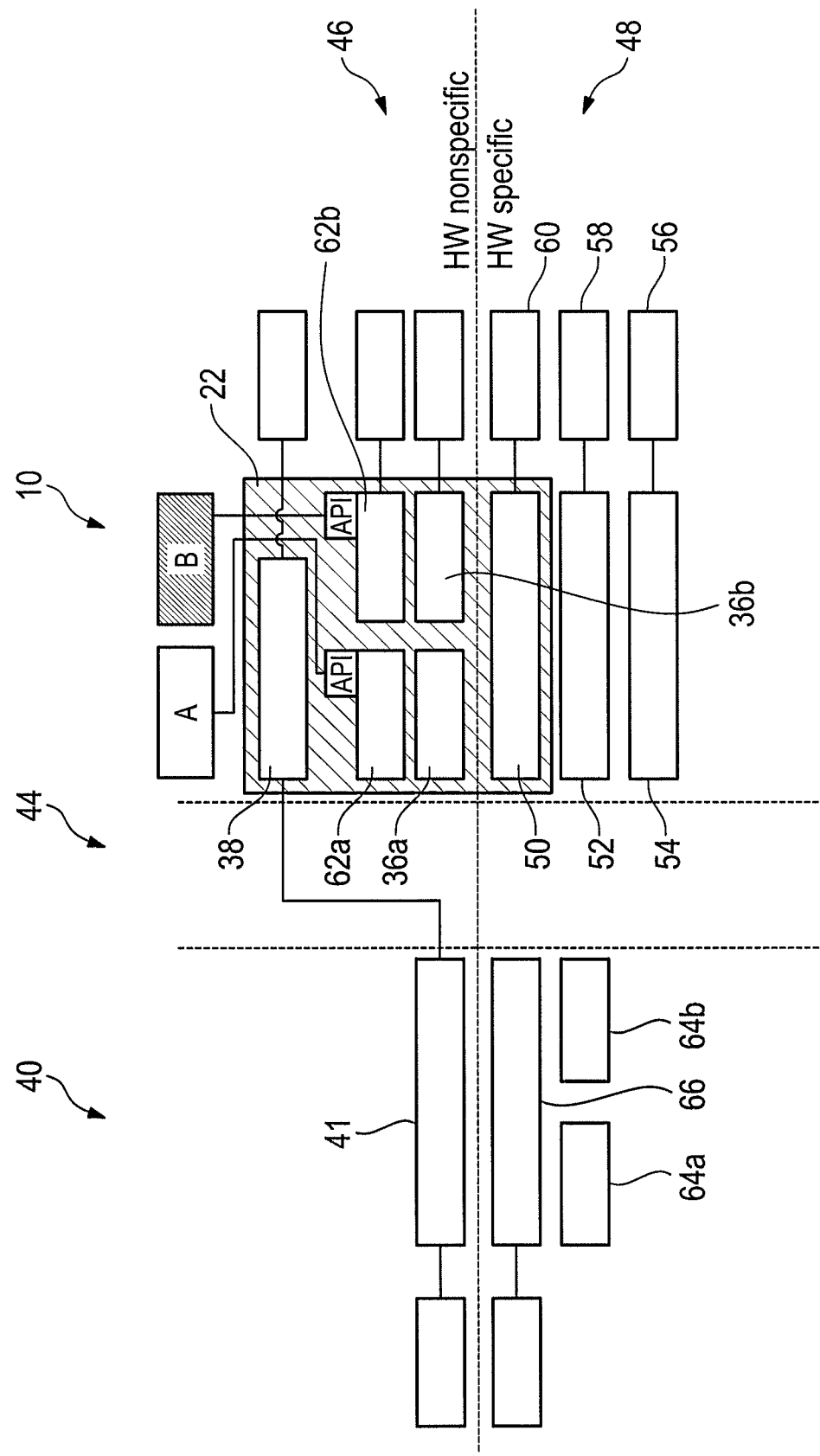
FIG. 3 is a schematic representation of an architectural model of an automation system.

FIG. 3 shows an architectural model in which an embodiment of the automation system 10 is embedded.

The architecture model essentially comprises three components. These are the automation system 10, an external safety unit such as the aforementioned SPM 40, and a communication interface 44 between these two components.

All three components may include a hardware-nonspecific layer 46 and a hardware-specific layer 48. In the automation system 10, the safe runtime environment 22 decouples the hardware-specific layer 48 from the hardware-nonspecific layer 46 with a hardware-specific component called a system abstraction layer (SAL). The SAL 50 abstracts the safe runtime environment 22 from an operating system 52 and any associated hardware 54. Special hardware 56, which is addressed by operating system drivers 58, may be abstracted by stand-alone SAL drivers 60.

In the hardware-nonspecific layer 46, the automation system 10 implements a resource layer 36. The resource layer 36 provides the safe resources. The safe resources may be redundant and diversitary. The resource layer 36 may provide timers as well as the process data for each channel. In addition, the resource layer 36 may provide safety-related functionality, such as a safe CRC calculation.

An application manager 62a, 62b sits on top of the resource layer 36. In various embodiments, there can be one application manager for each user program 24, 26. The application manager checks the consistency of the two application programs 24, 26 when started and their CRC. The application manager 62a, 62b may further be in charge of cyclically calling the application programs, monitoring their execution, and providing an API. The API may include functions for setting the outputs, for reading the inputs, and for starting and reading the application timers. As shown herein, the application manager 62a, 62b can be of dual and diversitary design.

The safe runtime environment 22 of the automation system 10 further implements a local safety instance 38. The local safety instance 38 can perform the necessary safety tasks. The safety tasks may include RAM and ROM tests, cycle and sequence monitoring, and timer tests. Furthermore, the local safety instance 38 can perform consistency checks of the process data of the user programs 24, 26. For this purpose, the local safety instance 38 may run only once on the system and may be checked via the SPM 40 externally.

The SPM 40 is a fail-safe device having safe hardware formed, for example, by two redundant processors 64a, 64b that allow safe execution of an application in a manner known per se. Since the SPM does not execute user programs for control in terms of the user programs of the automation system 10, the hardware may be of simple design. In particular, special safe CPUs can be used for processors 64a, 64b, which fail-safety can be practicably ensured, for example by FMEA.

A second safety instance 41 may be executed on the SPM 40. The second safety instance may be implemented in a hardware-independent manner and decoupled from the hardware by an abstraction layer 66. The second safety instance 41 may communicate with the first safety instance 38 of the automation system 10 via the communication interface 44.

The communication interface 44 may be a single channel communication interface without any special safety design. Fail-safety of the communication may be ensured by the interaction of the local safety instance 38 of the automation system 10 and the second safety instance 41 of the external security device via Black-Channel-Principal.

In various embodiments, the safe runtime environment 22 and the SPM 40 communicate with each other in a fixed cycle with time-out monitoring. When prompted by the SPM 40, data (e.g. timer values, sequence control, etc.) are deliberately falsified at certain points. For this purpose, the safe runtime environment 22 has manipulators that can be activated by the SPM 40, for example by the SPM 40 sending a corresponding ID of the manipulators to the safe runtime environment 22. The SPM 40 subsequently expects an appropriate error response from the safe runtime environment 22. In other words, the SPM 40 expects a certain behavior of the safe runtime environment 22 after a manipulator ID has been transmitted.

The safe runtime environment 22 may not have an error detectable by the user due to the manipulators or shut down the outputs due to the intentional tampering. Therefore, the error must be caught by the safe runtime environment 22. The concept makes it possible to test the system behavior at the real time when the program is running.

Figure 4:
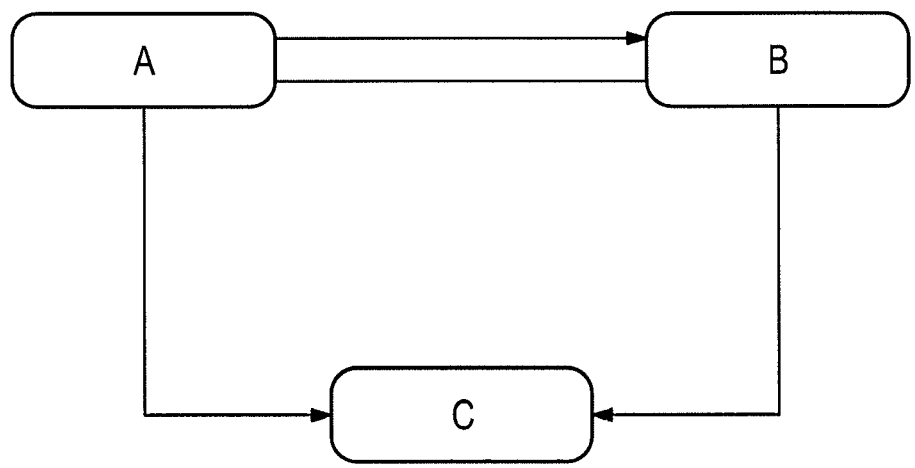
FIG. 4 is a state diagram of an error routine of an automation system according to the principles of the present disclosure.

FIG. 4 shows in a state diagram possible states that the SPM 40 and the automation system 10 may assume during a check.

In a normal state A, the safe runtime environment 22 waits for an error to respond thereon. In this state, if the safe runtime environment 22 receives a manipulator ID from the SPM 40, the corresponding manipulator is activated. The manipulator ID may include a defined bit mask. The safe runtime environment 22 then transitions to state B, in which it is desensitized to the corresponding error. Subsequently, manipulation of the data is carried out in order to simulate an error. Preferably, the data is XORed with the received bit mask, so that the error bit position can be rolled by the SPM 40.

In response to the manipulation, the safe runtime environment 22 must generate the appropriate error response that the SPM 40 expects. If the expectation does not occur, the safe runtime environment 22 and/or the SPM 40 may trigger a safe shutdown, for instance, using a separate second shutdown path. In various embodiments, the second shutdown path may be implemented by the interaction of the SPM 40 and the safe peripheral module 20. However, it goes without saying that other shutdown means are also conceivable.

If the test is completed successfully, the safe runtime environment 22 returns to the normal state A. If a real error occurs during desensitization, it will be caught by the desensitization, however, the test would be unsuccessful and a non-catch error message will be transmitted to the SPM 40.

With the external tests by the SPM 40, all tests executed in the local safety instance in a single channel manner can be checked separately. For example, the external tests may verify the following single-channel tests: Input data comparisons, output data comparisons, RAM tests, ROM tests, timer tests, cycle monitoring, safe runtime environment expiration monitoring 22, and user program expiration monitoring 24, 26.

Figure 5:
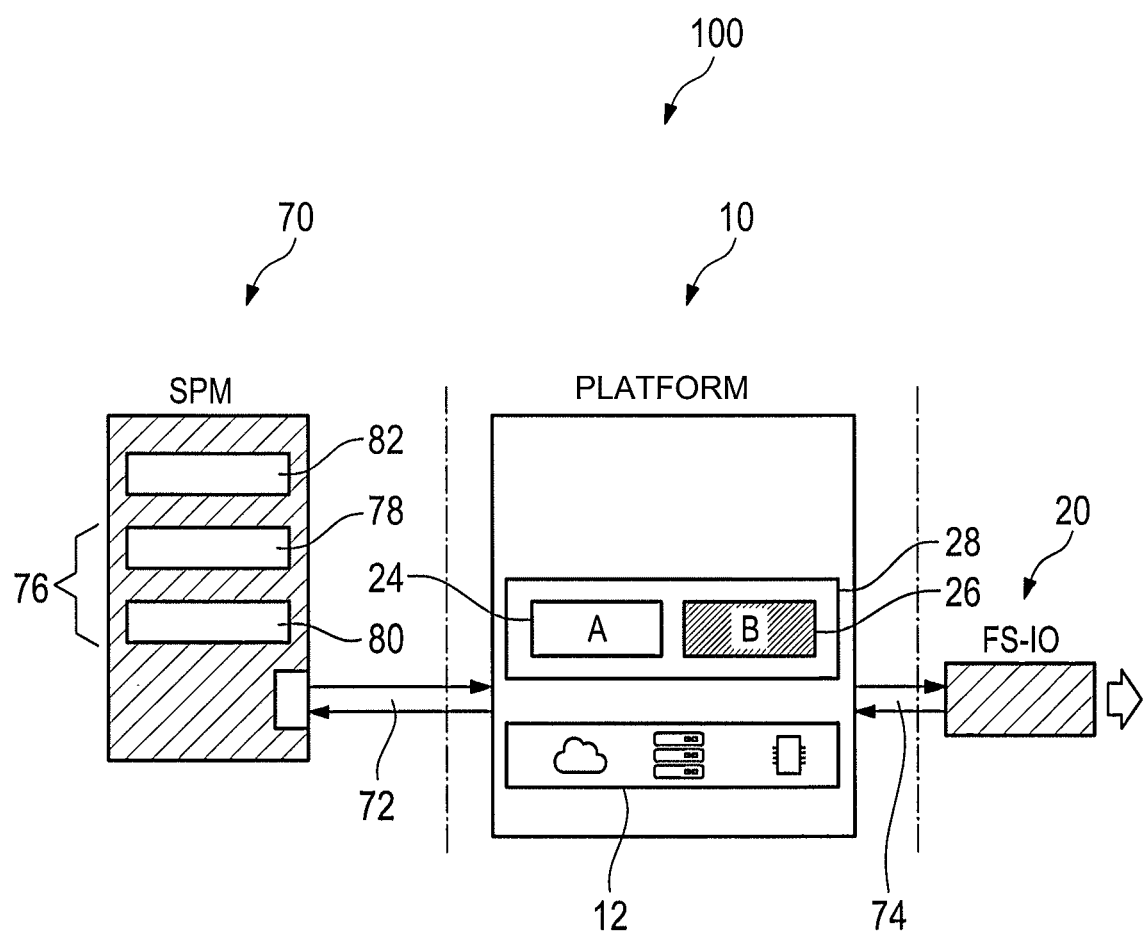
FIG. 5 is a schematic diagram of an automation system according to the principles of the present disclosure.

FIG. 5 shows a schematic representation of an automation system according to a second embodiment.

The automation system according to the second embodiment is denoted here its entirety by reference numeral 100. Parts with the same reference numerals denote the same parts as in the first embodiment and will not be explained again.

Here, the automation system 100 comprises three individual components.

The first component is an automation system 10, which is built on a non-safe platform 12. In particular, the automation system is configured to implement a safety function 28 by means of two user programs 24, 26. Thus, the first component may comprise an automation system as has been described with respect to the first embodiment. However, it will be understood that the first component is not limited to such an embodiment, but any automation system is suitable as the first component.

The second and third components are a monitoring device 70 and a fail-safe peripheral module 20. The monitoring device 70 may be, in particular, the SPM that has been described above reference numeral 40.

The monitoring device 70 and the fail-safe peripheral module 20 are coupled to the automation system 10 via a first communication interface 72 and a second communication interface 74. In addition to communication with the automation system, the first communication interface 72 and the second communication interface 74 likewise enable communication between the monitoring device 70 and the fail-safe peripheral module 20. In other words, the monitoring device 70 can communicate with the fail-safe peripheral module 20 via the platform 12. The first communication interface 72 and second communication interfaces 74 may be communication interfaces of a single-channel design, for instance a commercially available USB interface. It is understood that other communication interfaces, such as Ethernet, RS232, etc., are conceivable as well.

The monitoring device 70 may be a stand-alone hardware component configured to provide fail-safe services 76. The fail-safe services 76 may be implemented in software or in hardware, wherein the intrinsic fail-safety is ensured by appropriate measures, for example, by the services having a multi-channel redundant design or else being executed on a multi-channel redundant hardware in a manner known per se, so that a fail-safe operation of the services 76 can be ensured and tested. It is understood that the fail-safe design is not limited to the form shown here, but other measures known to the skilled person for obtaining intrinsic fail-safety are also conceivable.

The fail-safe services 76 are can be simple services, such as for example a counter unit 78 and an encoding unit 80. The fail-safe services 76 can thus be implemented on hardware that is simple and of low complexity. For example, the hardware of the monitoring device 70 may comprise one or more simple microcontrollers, ASICs, or similar computing devices, or may be composed of discrete electrical components. When using microcontrollers, their instruction set should be as limited as possible, so that certification with regard to intrinsic fail-safety is possible at low cost. In various embodiments, the hardware of the monitoring device 70 can be limited to being able to execute the counter unit 78 and encoding unit 80.

The fail-safe services 76 interact with the fail-safe peripheral module 20 to ensure safe shutdown even in the event of a failure of the non-safe platform 12, regardless of the implementation of the safety function 28.

In various embodiments, the monitoring device 70 may not itself have any further safety-related means for this purpose, i.e. the monitoring device may not have its own dedicated safe outputs it can control as shutdown path of the safety-critical process. Instead, the coupling to the safety-critical process may only be achieved via the fail-safe peripheral module 20.

In various embodiments, the monitoring device 70 may further comprise a testing device 82 in the form of a safety instance that interacts with a safe runtime environment 22 implemented on the platform 12 to provide additional testing facilities for the user programs 24, 26. Preferably, as previously described in connection with the first embodiment, the safe runtime environment 22 is implemented in a user program-unspecific manner and is identical for different automation systems 10. Thus, a unified testing device 82 can be used to independently test the safety of various safety functions 28 on different platforms 12, and the monitoring device 70 itself can be used as an ultima ration together with the fail-safe peripheral module to transition the process into a safe state. The monitoring device 70 can thus be used on various automation systems without additional adaptations.

Furthermore, the monitoring device 70 may be replaced simply by another monitoring device in case of a defect.

According to the second embodiment, it is thus an idea to divide the safe control system into different, in particular hardware-nonspecific components. The focus of the first component in this regard is to provide as much computing capacity as possible for the implementation of the safety function 28 and to enable easy development of the associated user programs 24, 26. The focus of the second and third components, on the other hand, is on designing the hardware for these as simply as possible so that the fail-safety of the services provided 76 can be guaranteed reliably and cost-effectively.

Figure 6:
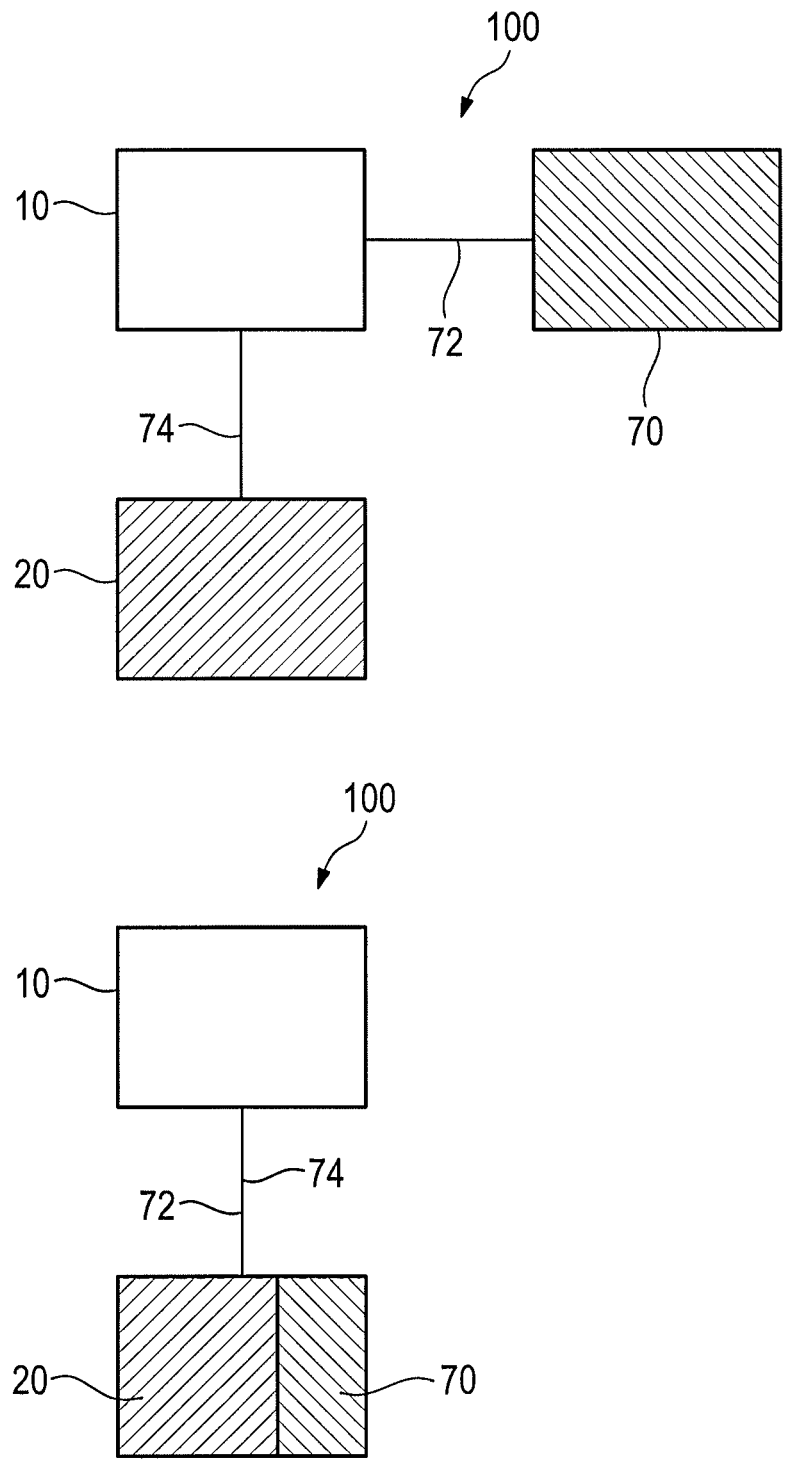
FIG. 6 is a schematic diagram of two variants according to the principles of the present disclosure.

FIG. 6 shows two variants of an automation system according to the second embodiment.

In the first variant (shown in the figure above), the three components of the automation system 100 are stand-alone hardware components. Both the monitoring device 70 and the fail-safe peripheral module 20 are each set up as a hardware component. A first communication interface 72 connects the monitoring device 70 to the automation system 10, and a second communication interface 74 connects the fail-safe peripheral module 20 to the automation system 10. Thus, communication between the monitoring device 70 and the fail-safe peripheral module 20 may take place exclusively via the automation system 10.

The variant with separate components has the advantage that each component can be manufactured and distributed separately. Thus, a monitoring device 70 may be used in conjunction with a plurality of different peripheral modules 20. The automation system 100 can thus be adapted to the respective requirement, wherein only the peripheral module 20 has to be replaced.

In the second variant (shown in the figure below), the monitoring device 70 and the fail-safe module 20 are implemented on a common hardware. A first logical communication interface 72 and a second logical communication interface 74 are thus implemented herein by a single physical connection to the automation system 10. Despite the integration on a common hardware, a communication between the monitoring device 70 and the fail-safe peripheral module 20 may be routed over a first communication interface 72 and a second communication interface 74 via the automation system 10. In other words, the monitoring device 70 and the fail-safe peripheral module 20 are still implemented as two independent logical units despite the integration on a common hardware.

Advantageously, in this variant, a common safe hardware base may be used for the monitoring device 70 and the fail-safe module 20. For example, functions of the fail-safe peripheral module as well as the monitoring device 70 can be implemented via common processors that operate in a multi-channel redundant manner. Furthermore, in this variant, one physical communication interface is sufficient to implement the first communication interface and the second communication interfaces. Thereby, the safe automation system 100 can be implemented in a particularly favorable manner.

Figure 7:
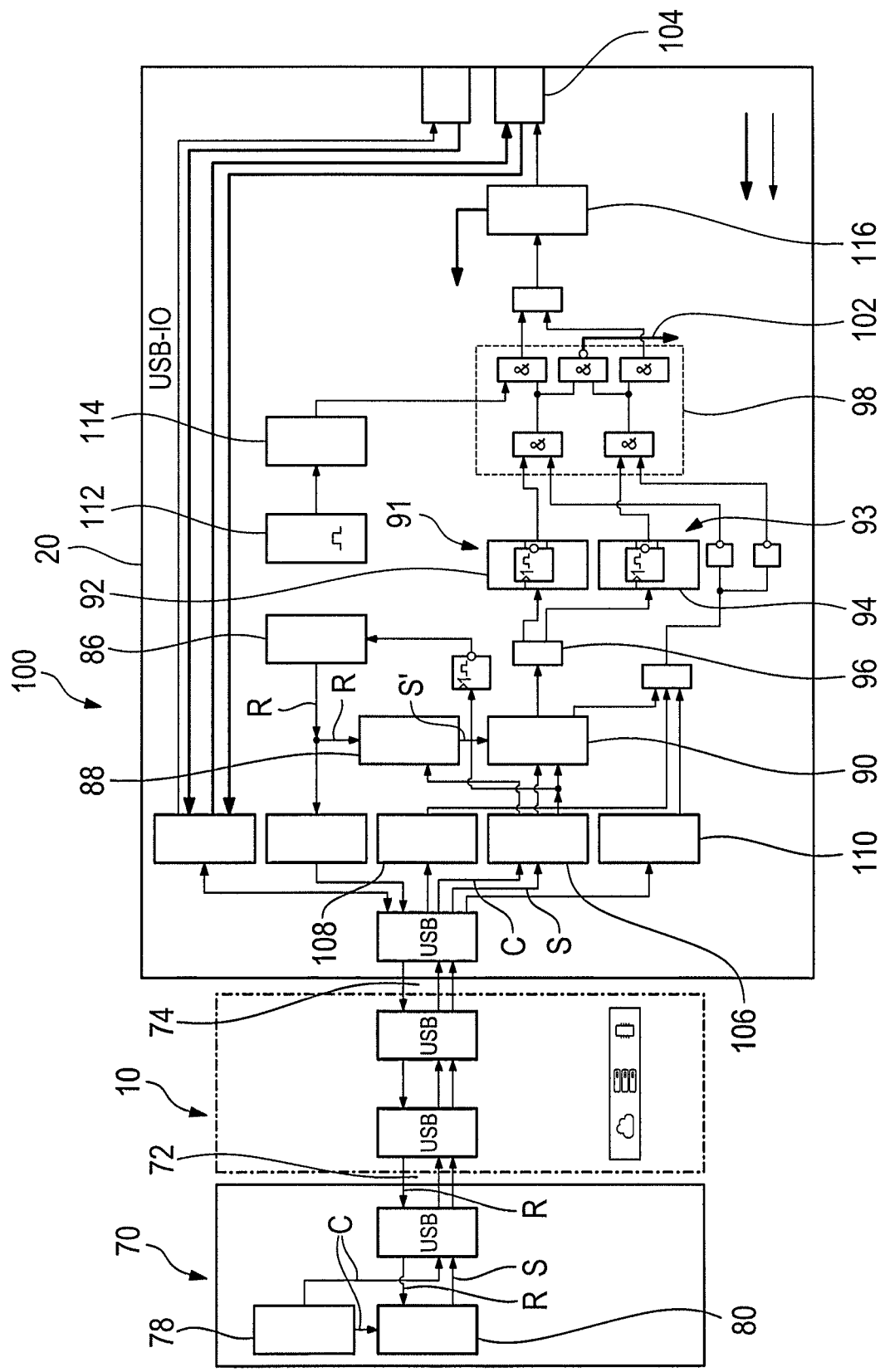
FIG. 7 is a circuit diagram of an automation system according to the principles of the present disclosure.

FIG. 7 shows a circuit diagram of an automation system according to the second embodiment.

Here, the automation system 100 includes a monitoring device 70, an automation system 10, and a fail-safe peripheral module 20 each as a stand-alone hardware component. In this embodiment, the communication between the individual components takes place via a USB interface. Accordingly, the first communication interface 72 and the second communication interface 74 are each USB connections.

The monitoring device 70 further comprises a counter unit 78 and an encoding unit 80 for implementing the fail-safe service 76. The counter unit 78 may continuously increment an internal counter and provide a counter value C to the encoding unit 80. Further, the counter value C may be transmitted to the fail-safe peripheral module 20 via the communication interfaces 72, 74.

The encoding unit 80 receives a random value R from the automation system 10. The random value R is generated by a random number generator 86 within the fail-safe peripheral module 20. The encoding unit 80 generates a key value S from the random value R and the counter value C, and transmits this key value to the fail-safe peripheral module 20 via the automation system 10.

The monitoring device 70 checks whether the random value, which may be transmitted cyclically by the automation system 10, changes over time. Since the key value S is based on both the random value R and the continuous counter C, it can be ensured that all numbers are cycled through at least once. This way, the monitoring device 70 does not have to check whether a random value generator, which generates the random value, actually cycles through all values. Such an evaluation would be computationally intensive and thus difficult to perform with only the limited computing capacity of the monitoring device 70.

The fail-safe peripheral module 20 has complementary units to those provided in the monitoring device 70. These complementary units can be designed as dedicated units or implemented in the form of software modules.

Here, the fail-safe peripheral module 20 includes a decoding unit 88 and a comparator unit 90 as complementary units. The decoding unit 88 receives the continuous counter value C and a copy of the random value R and generates a comparator value S' therefrom. If the received key value S and the generated comparison value S' are identical, the fail-safe peripheral module 20 signals a safe state. In various embodiments, the decoding method is known only to the decoding unit 88 of the fail-safe peripheral module 20 and the encoding is known only to the encoding unit 78 of the monitoring device 70.

In various embodiments, the safe state may be signaled by means of a first output circuit 91 having a first monostable flip-flop 92 and a second output circuit 93 having a second monostable flip-flop 94. The comparator 90 acts in an alternating manner on the two output circuits 91, 93, i.e. on the monoflops 92, 94, via a switch 96. The fail-safe peripheral module 20 indicates a safe state when at least one of the two monoflops 92, 94 is triggered. In normal operation, when the comparator 90 continuously provides a signal, i.e. a comparison between the key value S and the generated intermediate value S' is continuously successful, both monoflops 92, 94 are usually triggered, i.e. the cycle time in which new keys are sent is correspondingly matched to the holding time of the monoflops 92, 94.

For a test of whether the fail-safe peripheral module 20 correctly signals the safe state, the monitoring device 70 generates an incorrect key value by inverting one bit of the correct key value S. As a result, the comparator 90 detects a mismatch between the key value S and the generated intermediate value S' and interrupts the signal to the switch 96.

As a result, one of the two monoflops initially turns off and no longer supplies a signal at the output. This may be detected by the logic circuit 98 downstream of the monoflops, whereupon a time-out signal 102 is generated. The time-out signal 102 may be read back by the monitoring device 70, allowing it to determine whether an incorrect numerical value as the key value S results in an expected drop of one of the two monoflops.

Since only one monoflop is shut off during the test, the fail-safe peripheral module continues to signal a safe state, provided that the shutoff monoflop is retriggered by a correct key value S in a timely manner. If retriggering is not performed in time, the second monoflop also shuts off and the fail-safe peripheral module 20 will signal a non-safe state. In the present embodiment, signaling a non-safe condition would cause the safe outputs 104 to be turned off. It is to be understood that the embodiment with monoflops 92, 94 is only one possible embodiment of the output circuits 91, 93. The two branches may also be designed differently and only have to be activatable and deactivatable. Preferably, the output circuits are arranged to deactivate themselves after a defined period of time from activation. Alternatively, however, deactivation from an external source is also conceivable.

In addition to the components that implement the watchdog principle illustrated herein, the fail-safe peripheral module 20 may have additional test devices that may be combined with the watchdog protection. For example, in addition to a first input register, two further input registers 108, 110 may be provided which comprise a previous value and a subsequent value by which address corruption can be detected. Further, the fail-safe peripheral module 20 may include a safe clock generator 112 that provides a safe clock signal that is usable for various safety-related applications. One such application may be, for example, a voltage monitoring device 114 that monitors a safe power supply and may act on the safe outputs 104 of the fail-safe peripheral module 20. It is also conceivable to implement a restart lock 116 that prevents the safety-critical process from restarting on its own when an error has occurred.

It is to be understood that the implementation illustrated herein is only one example of how an automation system 100 may be implemented in accordance with the invention. It is understood that other variants are conceivable without leaving the scope of this disclosure. In principle, the scope of protection of the present application is given by the claims and is not limited by the features shown in the description or the figures.

The phrase at least one of A, B, and C should be construed to mean a logical (A OR B OR C), using a non-exclusive logical OR, and should not be construed to mean "at least one of A, at least one of B, and at least one of C."

What is claimed is:

1. An automation system for monitoring a safety-critical process, comprising:
a platform configured to execute user programs, which implement a safety function;
a fail-safe peripheral module configured to couple the user programs with the safety-critical process; and
a monitoring device configured to ensure fail-safe execution of the safety function on the platform, wherein:
the monitoring device is couplable to the platform via a first communication interface,
the fail-safe peripheral module is couplable to the platform via a second communication interface,
the monitoring device is configured to run a fail-safe service independently of the platform, via which the monitoring device interacts with the fail-safe peripheral module,
the fail-safe peripheral module is configured to signal a safe state based on the safety function and the fail-safe service, and
the fail-safe service includes a counter unit configured to generate a continuous counter value C and an encoding unit configured to generate a key value S.

2. The automation system of claim 1 wherein the monitoring device is configured to receive a random value R from the platform.

3. The automation system of claim 2 wherein the random value R is generated by the fail-safe peripheral module.

4. The automation system of claim 1 wherein the encoding unit is configured to generate the key value S from a random value R and the continuous counter value C.

5. The automation system of claim 1 wherein:
the first communication interface is further configured to forward the continuous counter value C and the key value S to the platform; and
the fail-safe peripheral module is configured to signal the safe state based on the safety function, the key value S, and the continuous counter value C.

6. The automation system of claim 1 wherein the monitoring device is a stand-alone hardware component detachable from the platform by a user.

7. The automation system of claim 6 wherein the monitoring device is a hardware dongle.

8. The automation system of claim 1 wherein the monitoring device is integrated into the fail-safe peripheral module.

9. The automation system of claim 1 wherein at least one of the first communication interface and the second communication interface is a non-safe communication interface.

10. The automation system of claim 1 wherein the monitoring device is configured to transmit a false value that does not correspond to the key value S as a key value at a defined time.

11. The automation system of claim 10 wherein the monitoring device is configured to invert a bit of the key value S to generate the false value.

12. The automation system of claim 11 wherein the monitoring device is configured to invert the bit of the key value S in a rolling manner.

13. The automation system of claim 1 wherein:
the fail-safe peripheral module comprises a decoding unit and a comparator unit;
the decoding unit is configured to generate an intermediate value S' from the continuous counter value C and from a random value R; and
the comparator unit is configured to compare the intermediate value S' with the key value S.

14. The automation system of claim 13 wherein the decoding unit and the comparator unit are implemented in a fail-safe manner.

15. The automation system of claim 14 wherein:
the fail-safe peripheral module comprises a first output circuit and a second output circuit;
the first output circuit is activatable and deactivatable;
the second output circuit is activatable and deactivatable;
the comparator unit is configured to act on the first output circuit and the second output circuit in an alternating manner, so that one of the first output circuit and the second output circuit is alternately activated; and
the fail-safe peripheral module is configured to, in response to one of the first output circuit and the second output circuit being activated, signal a safe state.

16. The automation system of claim 15 wherein the fail-safe peripheral module is configured to, in response to an incorrect value being transmitted as a key value:
generate a time-out signal via one of the first output circuit and the second output circuit; and simultaneously signal the safe state via an other of the first output circuit and the second output circuit.

17. The automation system of claim 1 wherein the fail-safe peripheral module comprises a safe random number generator configured to generate a random value R.

18. The automation system of claim 1 wherein the fail-safe peripheral module is configured to receive a random value R.

19. The automation system of claim 1 wherein the fail-safe peripheral module is a stand-alone hardware component.

20. The automation system of claim 1 wherein at least one of the monitoring device and the fail-safe peripheral module is of multi-channel redundant design.

21. The automation system of claim 1 wherein the fail-safe peripheral module comprises a fail-safe clock generator.

22. A monitoring device for ensuring fail-safe execution of a safety function implemented by user programs on a platform, the monitoring device comprising:
   a first communication interface configured to communicate with the platform; and
   one or more microprocessors configured to execute instructions including:
      running a fail-safe service independently of the platform, and
      interacting with a fail-safe peripheral module via the fail-safe service, so that the fail-safe peripheral module signals a safe state based on the safety function and the fail-safe service,
      wherein the fail-safe service includes a counter unit configured to generate a continuous counter value C and an encoding unit configured to generate a key value S.

23. At least one processor coupled to a platform that executes user programs in order to implement a safety function, the at least one processor configured to execute instructions including:
   interacting with a fail-safe service that is implemented on a monitoring device that is couplable to the platform and implemented independently,
   signaling a safe state based on the safety function and the fail-safe service,
   continuing operation of a safety-critical process only in response to signaling of the safe state, and
   verifying inputs from the fail-safe service based on a continuous counter value C and a key value S.

24. A method for monitoring a safety-critical process with an automation system, comprising:
   providing a platform executing user programs in order to implement a safety function;
   coupling the safety-critical process with the user programs via a fail-safe peripheral module; and
   ensuring fail-safe execution of the safety function on the platform by a monitoring device;
   wherein the monitoring device is couplable to the platform via a first communication interface and the fail-safe peripheral module is couplable to the platform via a second communication interface,
   wherein the monitoring device runs a fail-safe service independently of the platform, through which the monitoring device interacts with the fail-safe peripheral module,
   wherein the fail-safe peripheral module signals a safe state based on the safety function and the fail-safe service, and
   wherein the fail-safe service includes a counter unit configured to generate a continuous counter value C and an encoding unit configured to generate a key value S.

* * * * *